United States Patent
Saba

(10) Patent No.: US 10,498,780 B2
(45) Date of Patent: Dec. 3, 2019

(54) SYSTEMS AND METHODS FOR STREAMING CONTENT

(71) Applicant: Facebook, Inc., Menlo Park, CA (US)

(72) Inventor: Maher Afif Saba, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 121 days.

(21) Appl. No.: 14/701,436

(22) Filed: Apr. 30, 2015

(65) Prior Publication Data
US 2016/0323334 A1    Nov. 3, 2016

(51) Int. Cl.
H04L 29/06 (2006.01)

(52) U.S. Cl.
CPC ........ H04L 65/4069 (2013.01); H04L 65/601 (2013.01); H04L 65/80 (2013.01); *H04L 65/607* (2013.01)

(58) Field of Classification Search
CPC ......... H04L 65/4069–4092; H04L 65/60–602; H04L 47/2416; H04L 47/26; H04L 47/38; H04L 65/601–607; H04L 29/06–06027; H04L 29/88; H04L 65/80; H04L 12/14–1446; G06F 15/16; H04N 21/23406–2385; H04N 21/437–4384; H04N 21/42692–47
See application file for complete search history.

(56) References Cited

U.S. PATENT DOCUMENTS

| | | | | |
|---|---|---|---|---|
| 7,895,629 B1* | 2/2011 | Shen | ........................ | H04N 7/18 710/52 |
| 8,516,121 B1* | 8/2013 | Telang | ................ | H04L 67/1097 707/640 |
| 9,276,967 B2* | 3/2016 | Casey | ................ | H04N 21/2662 |
| 2002/0165970 A1* | 11/2002 | Ludewig | .................. | H04L 29/06 709/228 |
| 2003/0005139 A1* | 1/2003 | Colville | ............. | H04N 21/4384 709/231 |
| 2006/0050970 A1* | 3/2006 | Gunatilake | ...... | H04N 21/23406 382/232 |
| 2009/0307367 A1* | 12/2009 | Gigliotti | .................. | G06F 15/16 709/231 |
| 2011/0153856 A1* | 6/2011 | Piepenbrink | ........ | H04L 47/2416 709/231 |
| 2013/0263200 A1* | 10/2013 | Li | ........................... | H04L 47/38 725/116 |
| 2014/0189099 A1* | 7/2014 | Hurst | ................... | H04N 21/437 709/224 |
| 2015/0127848 A1* | 5/2015 | Houdaille | ........... | H04L 65/4084 709/233 |

(Continued)

*Primary Examiner* — Wing F Chan
*Assistant Examiner* — Rajeshwari Krishnan
(74) *Attorney, Agent, or Firm* — Sheppard Mullin Richter & Hampton LLP

(57) ABSTRACT

Systems, methods, and non-transitory computer-readable media can send at least one request for streaming a content item. Data associated with at least one portion of the content item is streamed. A first rate at which the content item is encoded is determined. A second rate at which the content item is being streamed is determined. A need for adjusting the streaming of the content item is determined based at least in part on the first rate and the second rate. Streaming of the content item is adjusted. The adjustment causes the second rate at which the content item is being streamed to conform to the first rate.

20 Claims, 8 Drawing Sheets

(56) References Cited

U.S. PATENT DOCUMENTS

| | | | |
|---|---|---|---|
| 2015/0304197 A1* | 10/2015 | Nair | G06Q 30/0241 |
| | | | 709/224 |
| 2016/0112728 A1* | 4/2016 | Kaushik | H04N 21/2385 |
| | | | 725/116 |
| 2016/0212054 A1* | 7/2016 | Howard | H04L 47/25 |
| 2017/0104800 A1* | 4/2017 | Belovay | H04L 65/4092 |

* cited by examiner

SYSTEMS AND METHODS FOR STREAMING CONTENT

FIELD OF THE INVENTION

The present technology relates to the field of streaming content. More particularly, the present technology relates to techniques for adjusting the rate at which content is streamed.

BACKGROUND

Today, people often utilize computing devices (or systems) for a wide variety of purposes. Users can use their computing devices to, for example, interact with one another, create content, share information, and access information. In some instances, a user operating a computing device can access resources (e.g., a website of a content distribution system) over a network (e.g., Internet) to request content to be streamed to the computing device. Such content may include audio and/or video data, for example. Under conventional approaches, the content to be streamed may be encoded at a constant or variable bit rate. This bit rate provides a measure of the number of bits needed to provide the content on the computing device over some period of time. For example, if a video was encoded at a bit rate of 200 kilobits per second (kbps), then streaming each second of the video generally requires transmitting 200 kilobits of data to the computing device.

When streaming content, a content player running on the computing device can be configured to buffer some portion of the content to reduce interruptions that may arise, for example, as a result of insufficient network bandwidth. In instances where the computing device has network bandwidth that is greater than that which is needed to stream the content, the content player can continue to buffer the content data during the streaming. For example, if the computing device is able to download data at a rate of 1,000 kbps, and the video to be streamed was encoded at 200 kbps, then the computing device can potentially buffer, at each second, an additional four seconds of the video. Such conventional approaches, however, may result in an unnecessary waste of resources, such as network bandwidth, if the buffered portions of the content are not utilized. For instance, using the example above, if the user ceases playback of the video within one second, then the bandwidth used to buffer the additional four seconds of the video was not optimized.

SUMMARY

Various embodiments of the present disclosure can include systems, methods, and non-transitory computer readable media configured to send at least one request for streaming a content item. Data associated with at least one portion of the content item is streamed. A first rate at which the content item is encoded is determined. A second rate at which the content item is being streamed is determined. A need for adjusting the streaming of the content item is determined based at least in part on the first rate and the second rate. Streaming of the content item is adjusted. The adjustment causes the second rate at which the content item is being streamed to conform to the first rate.

In an embodiment, when the second rate is greater than the first rate, a size of a buffer for storing data associated with the content item is adjusted to reduce the size of the buffer.

In an embodiment, when the second rate is greater than the first rate, an amount of data that is requested in subsequent requests for streaming the content item is adjusted to reduce the amount of data that is requested.

In an embodiment, when the second rate is greater than the first rate, a rate at which subsequent requests for streaming the content item are sent by the computing device is adjusted to reduce a number of subsequent requests sent by the computing device or a frequency at which subsequent requests are sent by the computing device.

In an embodiment, when the second rate is less than the first rate, a size of a buffer for storing data associated with the content item is adjusted to increase the size of the buffer.

In an embodiment, when the second rate is less than the first rate, an amount of data that is requested in subsequent requests for streaming the content item is adjusted to increase the amount of data that is requested.

In an embodiment, when the second rate is less than the first rate, a rate at which subsequent requests for streaming the content item are sent by the computing device is adjusted to increase a number of subsequent requests sent by the computing device or a frequency at which subsequent requests are sent by the computing device.

In an embodiment, a determination is made that an adjustment to the streaming of the content item is needed upon determining that the second rate is greater than the first rate and determining that a difference between the second rate and the first rate satisfies a threshold.

In an embodiment, a determination is made that an adjustment to the streaming of the content item is needed upon determining that the second rate is less than the first rate and determining that a difference between the first rate and the second rate satisfies a threshold.

In an embodiment, a size of a buffer for storing data associated with the content item is adjusted. A size for a second buffer for storing content data associated with a second content item is set based at least in part on the adjusted size.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
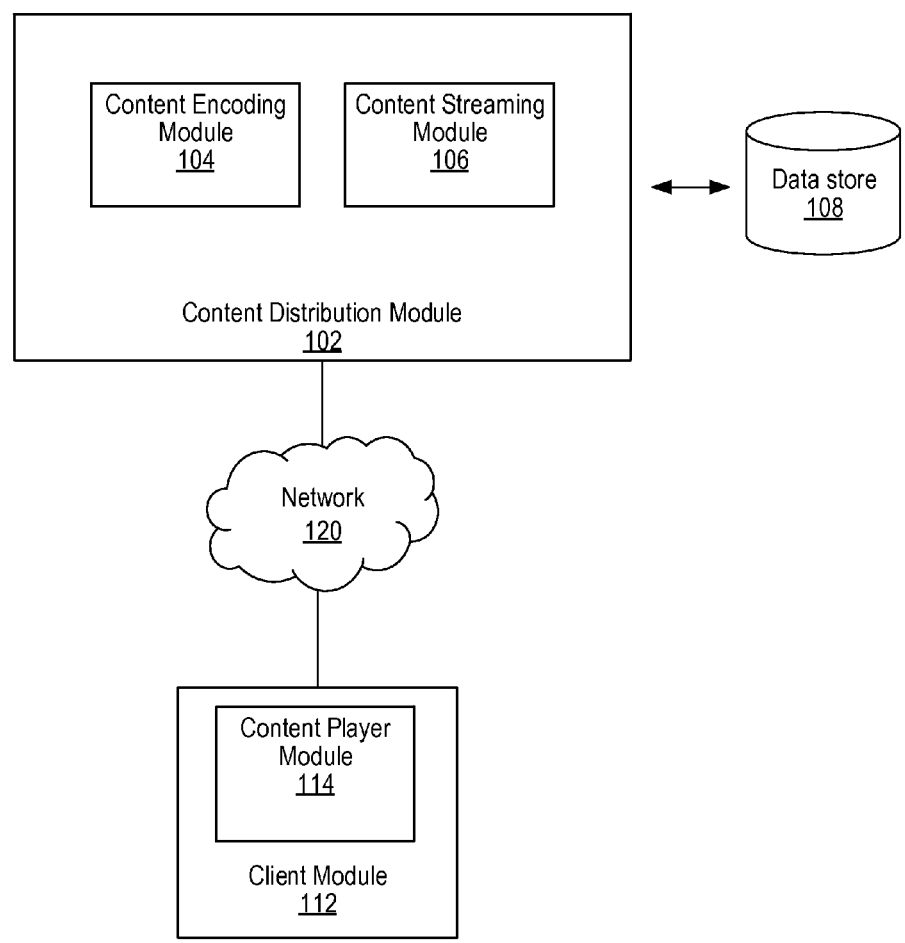
FIG. 1 illustrates an example system including an example content distribution module configured to facilitate the distribution of content over a network and a client module configured to facilitate streaming of the content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Dynamically Adjusting the Streaming of Content

People use computing devices (or systems) for a wide variety of purposes. A user can operate a computing device to request that content or media (e.g., audio and/or video data) be streamed to the computing device over a network (e.g., Internet). The streaming of content typically involves delivering data associated with the content (content data) over the network from a computing system to the computing device. As the content data is being downloaded or streamed, a content player executing on the computing device can be used to process and present the content, for example, by displaying video content on a display screen and/or by playing audio content.

As mentioned, under conventional approaches, the content to be streamed may be encoded at some bit rate, or data rate, that is either constant or variable. In instances where the content item is a video file, the bit rate for the content item can be based on factors such as video and/or sound quality. In instances where the content item is an audio file, the bit rate for the content item can be based on sound quality. The bit rate provides a measure of the number of bits needed to provide the content to the computing device over some period of time. For example, when streaming content that has been encoded at a bit rate of 200 kilobits per second (kbps), the computing system will generally need to deliver, to the computing device, 200 kilobits of content data associated with each second of the content. Thus, streaming a five second video encoded at 200 kbps will generally require 1000 kilobits of data to be delivered to the computing device.

Under conventional approaches, the content player running on the computing device is configured to periodically send requests to the computing system to obtain additional data corresponding to the content being streamed. Such requests can be used to notify the computing system that the computing device is ready to receive additional content data as well as to indicate the amount of data (e.g., bits) that is being requested from the computing system.

The content player can also be configured to buffer some portion of the content to reduce interruptions that may arise during streaming. The amount of content buffered can depend on various network conditions, such as the amount of bandwidth that is available to the computing device and/or the computing device. For example, in situations where the network bandwidth available to the computing device is inadequate, the size of the buffer can be increased to allow for more content to be buffered, or downloaded, before the content is played. By buffering more content ahead of time, interruptions resulting during the streaming of the content due to inadequate network bandwidth can be reduced. Alternatively, in situations where network bandwidth is not an issue, the size of the buffer can be reduced so that less content needs to be buffered, thereby resulting in the content being streamed sooner.

As mentioned, such conventional approaches may result in an inefficient use of resources, such as network bandwidth. For example, if ten seconds of a video is buffered and the user operating the computing device stops playing the video within one second, then the bandwidth used to buffer the additional nine seconds of the video was poorly utilized.

An improved approach to the streaming of content overcomes the foregoing and other disadvantages associated with conventional approaches. In general, systems and methods of the present disclosure can modify, or adjust, the streaming of content so that content data is delivered to a computing device at a rate (or running rate) that matches the rate at which the content is being consumed or played (or source rate). In various embodiments, the streaming of content is adjusted based at least in part on the rate (e.g., bit rate) at which the content was encoded (or source rate) and on the rate at which the content is being downloaded or streamed (or running rate). For example, a content player running on a computing device can adjust the streaming of content so that the rate at which the content is being downloaded or streamed is generally consistent with, or within a threshold value of, the rate at which the content was encoded.

In various embodiments, the streaming of content may be adjusted, for example, by increasing or decreasing the size of the buffer that is used to store the received content data. In another example, the streaming of content may be adjusted by modifying the number, or frequency, of requests that are sent by the computing device to obtain additional data corresponding to the streamed content. In some instances, the content player may also be configured to send such requests at periodic time intervals (e.g., every second) or at specified times during the streaming of the content. In another example, the streaming of content may be adjusted by modifying (e.g., increasing or decreasing) the amount of data (e.g., bits) that are requested in subsequent requests for data associated with the content that are sent during the streaming. By implementing such approaches, the systems and methods of the present disclosure allow for streaming of content at a constant, or near constant, rate (e.g., bit rate). The streaming of content at a constant, or near constant, rate can be advantageous, for example, with respect to the managing server resources as well as content delivery network (CDN) capacity.

FIG. 1 illustrates an example system 100 including an example content distribution module 102 configured to facilitate the distribution of content over a network 120 and a client module 112 configured to facilitate streaming of the content, according to an embodiment of the present disclosure. As shown in the example of FIG. 1, the content distribution module 102 can include a content encoding module 104 and a content streaming module 106. The client module 112 can include a content player module 114. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content distribution module 102 and/or the client module 112 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content distribution module 102 and/or the client module 112 can be implemented, in part or in whole, as software running on one or more computing devices or systems, such as on a user (or client) computing device. For example, the client module 112, or at least a portion thereof, can be implemented as or within an application (e.g., app), a program, or an applet, etc., running on a user computing device or a client computing system, such as the user device 710 of FIG. 7. Further, the content distribution module 102, or at least a portion thereof, can be implemented using one or more computing devices or systems that include one or more servers, such as network servers or cloud servers. In some instances, the content distribution module 102 can, in part or in whole, be implemented within or configured to operate in conjunction with a social networking system (or service), such as the social networking system 730 of FIG. 7. It should be understood that there can be many variations or other possibilities.

The content encoding module 104 can be configured to encode content data into some digital format that can be played by a content player. For example, video content can be encoded, for example, using various video codecs, such as the H.264 or MPEG-4 video formats. In another example, audio content can be encoded using various audio codecs, such as the MPEG-1 or MPEG-2 Audio Layer III (MP3) audio formats. Encoded content is typically associated with a rate (e.g., bit rate) that generally refers to the amount of data (e.g., number of bits) needed to playback the content per unit of playback time. For example, encoding content at 200 kilobits per second means that 200 kilobits of data is needed to playback each second of the content.

The content streaming module 106 can be configured to send, or transmit, data corresponding to portions of any encoded content that is requested, for example, by the client module 112. The content streaming module 106 can utilize generally known approaches and protocols for streaming content including, for example, the HyperText Transfer Protocol (HTTP) or the Real-time Streaming Protocol (RTSP), to name some examples. The content player module 114 can begin playing the content received by the client module 112 while additional data associated with the content continues to be received from the content streaming module 106. More details regarding the content player module 114 will be provided below in reference to FIG. 2.

Furthermore, in some embodiments, the content distribution module 102 can be configured to communicate and/or operate with the at least one data store 108, as shown in the example system 100. The at least one data store 108 can be configured to store and maintain various types of data. In some embodiments, the at least one data store 108 can store information that is utilized by the content distribution module 102. In some instances, the at least one data store 110 can store video content and/or audio content that has been encoded. Such content may be encoded at a specified, or pre-determined, bit rate and the at least one data store 110 can store information describing the respective bit rates of the stored video and/or audio content. In some implementations, the at least one data store 108 also can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

Figure 2:
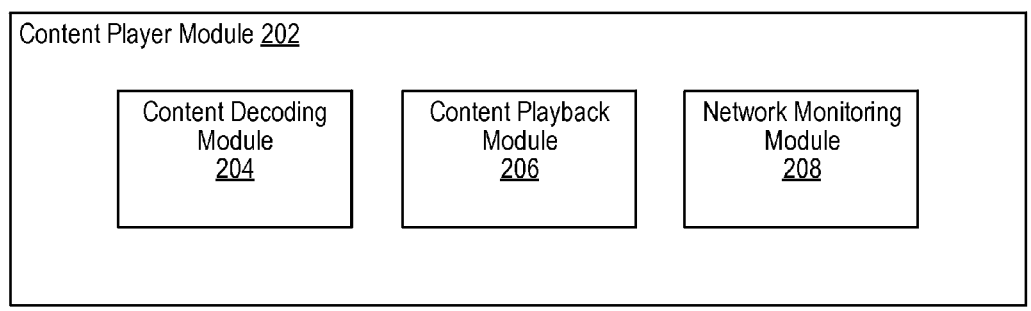
FIG. 2 illustrates an example content player module configured to facilitate streaming of content, according to an embodiment of the present disclosure.
Figure 2:
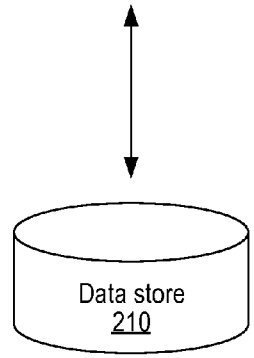

FIG. 2 illustrates an example content player module 202, according to an embodiment of the present disclosure. In some embodiments, the content player module 114 of FIG. 1 can be implemented with the content player module 202. As shown in the example of FIG. 2, the content player module 202 can include a content decoding module 204, a content presentation module 206, and a network monitoring module 208.

The content decoding module 204 can be configured to decode content data so that encoded content can be played by the content player module 202. As mentioned, content data can be encoded before being sent or transmitted. Once content data is received by the content player module 202, the content decoding module 204 can decode the content data, for example, by determining the format, or codec, used to encode the content data and using that information to decode the content data using generally known techniques. The decoding process can be performed as the content data is streamed to the content player module 202.

The content playback module 206 can be configured to play the decoded content as the content is received. For example, the content playback module 206 can be configured to play video content on a display screen and/or to play audio content through an audio output source.

The network monitoring module 208 can be configured to determine the speed, or rate, at which content is being streamed or processed by the content player module 202. For example, the network monitoring module 208 can determine a running rate (e.g., bits per second) of any content being streamed by dividing the amount of data (e.g., number of bits) corresponding to the streamed content that has been received by the duration of time over which the content has been streamed. Thus, for example, if 500 kilobits of content data has been received over a duration of five seconds, then the running rate is 100 kilobits per second. Depending on the implementation, the network monitoring module 208 can be configured to determine the running rate of streaming content periodically at specified time intervals and/or when a call, or instruction, is received from the content player module 202. The network monitoring module 208 can also be configured to determine a source rate at which the streamed content was encoded. In some instances, the network monitoring module 208 may receive, or obtain, information, or data, describing the source rate at which content being streamed to the content player module 202 was encoded.

In various embodiments, the network monitoring module 208 can be configured to modify, or adjust, the streaming of content so that content data is delivered to the content player module 202 at a rate that matches the speed at which the content is being consumed or so that a difference between the rate that content data is being delivered and the rate at which content is being consumed is within a threshold value. For example, the network monitoring module 208 can adjust the streaming of content so that the rate at which the content is being downloaded or streamed to the content player module 202 matches, or is generally consistent, with the rate at which the content was encoded or so that a difference between the rate at which the content is being downloaded or streamed and the rate at which the content was encoded is within a threshold value.

In some embodiments, the network monitoring module 208 can adjust the streaming of content by increasing or decreasing the size of the buffer, such as a data store 210, that is used to store the received content data. When increasing the size of the buffer, the network monitoring module 208 can increase the size by some specified amount or factor. In one example, when increasing the size of the buffer, the network monitoring module 208 can double the size of the buffer from its existing amount. Similarly, when decreasing the size of the buffer, the network monitoring module 208 can decrease the size by some specified amount or factor. In one example, when decreasing the size of the buffer, the network monitoring module 208 can half the size of the buffer from its existing amount.

In some embodiments, the network monitoring module 208 can adjust the streaming of content by modifying the number, or frequency, of requests that the content player module 202 sends, for example, to a content server or the content distribution module 102, for purposes of obtaining additional data associated with the content being streamed. For example, in a situation where a request for additional data is sent every second and each request is configured to request 4 kilobytes of data, if a determination is made that 8 kilobytes of data is needed every second, then the network monitoring module 208 can adjust the streaming by sending two requests for additional content every second so that a total of 8 kilobytes of data is requested every second.

In some embodiments, the network monitoring module 208 can adjust the streaming of content by modifying (e.g., increasing or decreasing) the amount of data (e.g., bits) that is requested in subsequent requests for the content being streamed. When increasing the amount of data requested, the network monitoring module 208 can increase the amount of data requested by some specified amount or factor. In one example, when increasing the amount of data requested, the network monitoring module 208 can double the amount of data from the amount previously requested. Similarly, when decreasing the amount of data requested, the network monitoring module 208 can decrease the amount of data requested by some specified amount or factor. In one example, when decreasing the amount of data requested, the network monitoring module 208 can halve the amount of data from the amount previously requested.

While content is being streamed, the network monitoring module 208 can determine the running rate at which the content is being streamed as well as the source rate at which the content was encoded. The network monitoring module 208 can compare the running rate and the source rate. Depending on the implementation, if the running rate is greater than the source rate, then any one or more of a variety of techniques can be implemented. In some embodiments, if the running rate is greater than the source rate, the network monitoring module 208 can reduce the size of the buffer that is used to store the received content data. In some embodiments, if the running rate is greater than the source rate, then the network monitoring module 208 can delay or reduce the number, or frequency, of requests that the content player module 202 sends for obtaining additional data corresponding to the content being streamed. In some embodiments, if the running rate is greater than the source rate, then the network monitoring module 208 can reduce the amount of data that is requested in subsequent requests for the content being streamed. For example, if the content being streamed was encoded at a source rate of 400 kilobits per second and the running rate for the content is 700 kilobits per second, then the network monitoring module 208 can adjust the streaming so that the running rate (e.g., 700 kbps) is more consistent with the source rate (e.g., 400 kbps) using the approaches described above.

In various embodiments, in addition to determining that the running rate is greater than the source rate, the network monitoring module 208 can also determine whether a difference between the running rate and the source rate satisfies a threshold. If the threshold is satisfied, then the network monitoring module 208 can adjust the streaming so that the running rate conforms to (e.g., equals or falls within a threshold value of) the source rate using the approaches described above.

Similarly, in some embodiments, if the running rate is less than the source rate, then the network monitoring module 208 can increase the size of the buffer that is used to store the received content data. In some embodiments, if the running rate is less than the source rate, then the network monitoring module 208 can increase the number, or frequency, of requests that the content player module 202 sends for obtaining additional data corresponding to the content being streamed. In some embodiments, if the running rate is less than the source rate, then the network monitoring module 208 can increase the amount of data that is requested in subsequent requests for the content being streamed.

By regulating the streaming of content in this manner, the network monitoring module 208 is able to control the rate at which content is received (i.e., running rate) so that the rate matches (e.g., equals), or generally matches (e.g., falls within a threshold value of), the rate at which the content was encoded (i.e., source rate). For example, if the content being streamed was encoded at a source rate of 400 kilobits per second and the running rate for the content is 100 kilobits per second, then the network monitoring module 208 can adjust the running rate (e.g., 100 kbps) to be more consistent with the source rate (e.g., 400 kbps) using the approaches described above. In various embodiments, in addition to determining that the running rate is less than the source rate, the network monitoring module 208 can also determine whether a difference between the source rate and the running rate satisfies a threshold. If the threshold is satisfied, then the network monitoring module 208 can adjust the streaming so that the running rate conforms to the source rate using the approaches described above.

In various embodiments, the types and amounts of adjustments made to the content streaming, as described above, can be stored and utilized when other content is requested. For example, if the size of a buffer used to store data associated with a content item was adjusted during streaming, the changes made to the size of the buffer can be used to update the initial, or default, buffer size that is used by the content player module 202 when requesting other content. Thus, for example, if the buffer used to store data associated with a video file was increased from 100 kilobytes to 150 kilobytes, then the initial, or default, buffer size used to obtain a different video file can be set to 150 kilobytes.

By periodically adjusting the streaming of content so that the rate at which the content is streamed is consistent with the rate at which the content was encoded, the network monitoring module 208 can provide a mechanism for streaming content at a constant, or near constant, rate.

Figure 3:
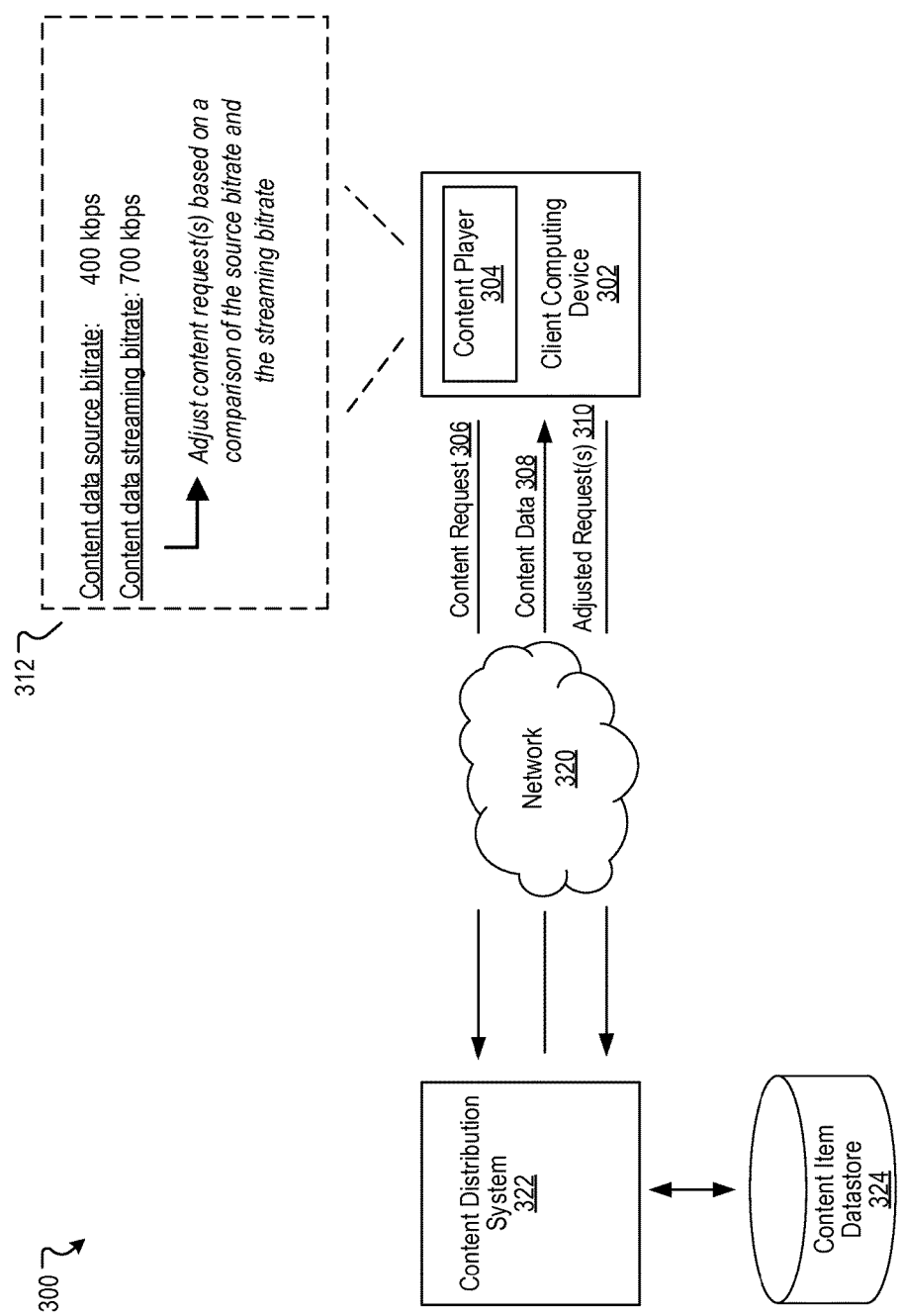
FIG. 3 illustrates an example scenario of dynamically adjusting the streaming of content, according to an embodiment of the present disclosure.

FIG. 3 illustrates an example scenario 300 of dynamically adjusting the streaming of content, according to an embodiment of the present disclosure. The example scenario 300 illustrates a client computing device 302 interacting with a content distribution system 322 over a network 320 (e.g., the Internet).

The client computing device 302 includes a content player 304 that is configured to play, or stream, content, as described in reference to the content player module 202 of FIG. 2. In this example, the content player 304 is requesting content to be streamed from the content distribution system 322. To initiate the streaming, the client computing device 302 can send, to the content distribution system 322, an initial request 306 for streaming the content. This request 306 may include information describing the content item to be streamed including, for example, information describing the size of the buffer that has been allocated on the client computing device 302 for receiving data corresponding to the content being streamed.

Upon receiving the request 306, the content distribution system 322 can access, or obtain, data associated with the requested content, for example, from a content item data store 324. In addition to storing various content (e.g., music, videos, etc.), the content item data store 324 may store information that describes various characteristics or attributes of the stored content. For example, for any given content item, the content item data store 324 can store information describing a corresponding play length, or duration, of the content item as well as encoding information that includes the rate (e.g., bit rate) at which the content item was encoded. The content distribution system 322 can send, or stream, data 308 associated with the content item to the client computing device 302. Generally, the content distribution system 322 can send portions of the content item as one or more data packets. The amount of data sent by the content distribution system 322 at any given time can be based, for example, on the size of the buffer allocated by the client computing device 302 or by the amount of data requested by the client computing device 302. As mentioned, the data 308 sent by the content distribution system 322 may include additional information about the content being streamed including, for example, the rate (e.g., bit rate) at which the content was encoded.

Once the data 308 is received, the content player 304 can process (e.g., decode) the data 308 and present the content through the client computing device 302, for example. In various embodiments, the content player 304 can be configured to evaluate the running rate at which the content is being streamed with respect to the source rate at which the content was encoded. In the example of FIG. 3, the client computing device 302 has determined 312 that the content was encoded at 400 kilobits per second and that the content is streaming at a rate of 700 kilobits per second. In this example, since the running, or streaming, rate (e.g., 700 kbps) is greater than the source rate at which the content was encoded (e.g., 400 kbps), the content player 304 can take measures to adjust the running rate to be more consistent with the source rate using one or more of the various approaches described above in reference to FIG. 2.

Figure 4:
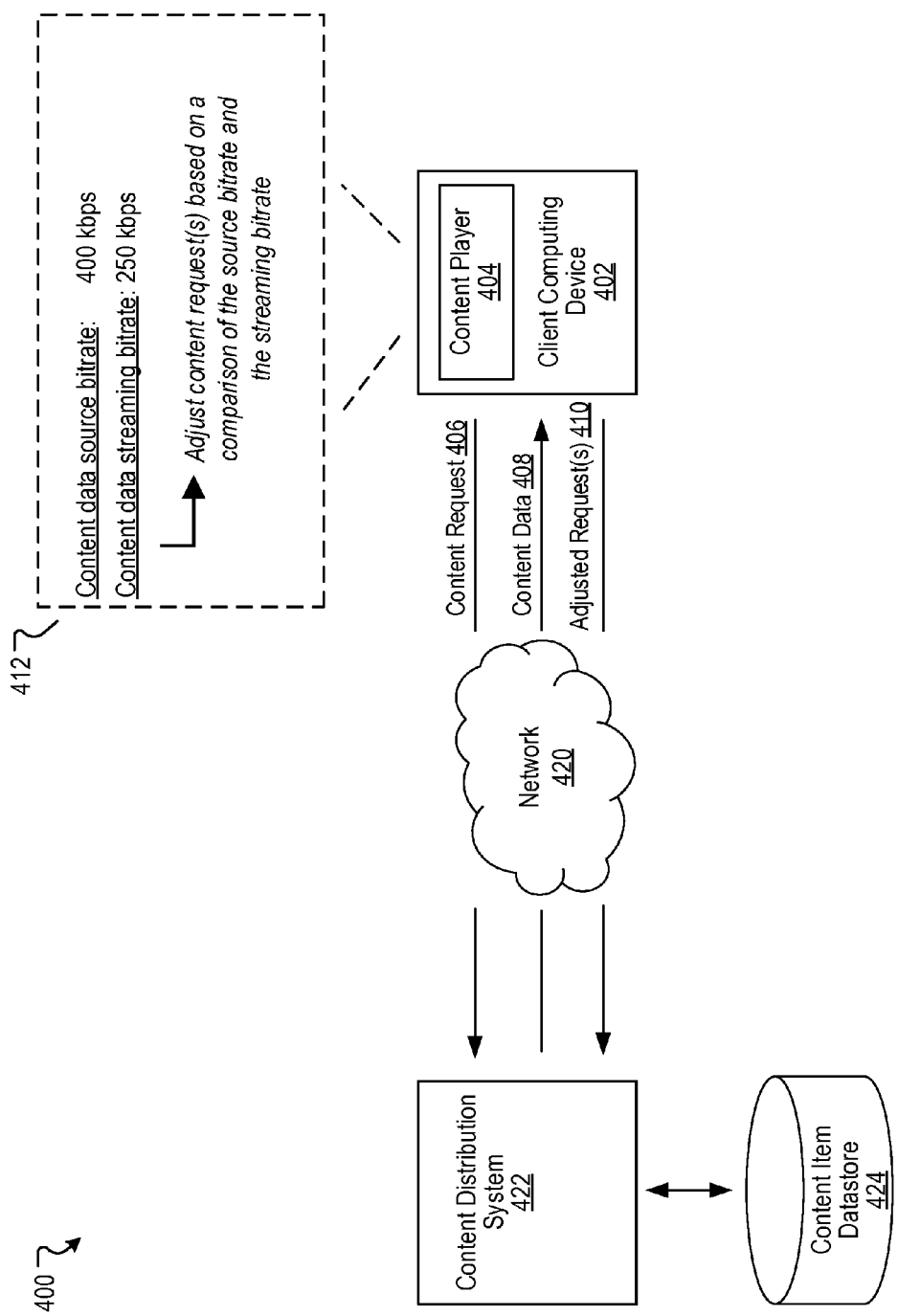
FIG. 4 illustrates another example scenario of dynamically adjusting the streaming of content, according to an embodiment of the present disclosure.

FIG. 4 illustrates another example scenario of dynamically adjusting the streaming of content, according to an embodiment of the present disclosure. The example scenario 400 illustrates a client computing device 402 interacting with a content distribution system 422 over a network 420 (e.g., the Internet).

The client computing device 402 includes a content player 404 that is configured to play, or stream, content, as described in reference to the content player module 202 of FIG. 2. In this example, the content player 404 is requesting content to be streamed from the content distribution system 422. To initiate the streaming, the client computing device 402 can send, to the content distribution system 422, an initial request 406 for streaming the content. This request 406 may include information describing the content item to be streamed including, for example, information describing the size of the buffer that has been allocated on the client computing device 402 for receiving data corresponding to the content being streamed.

Upon receiving the request 406, the content distribution system 422 can access, or obtain, data associated with the requested content, for example, from a content item data store 424. In addition to storing various content (e.g., music, videos, etc.), the content item data store 424 may store information that describes various characteristics or attributes of the stored content, as described above in reference to FIG. 3. The content distribution system 422 can send, or stream, data 408 describing the content item to the client computing device 402. Generally, the content distribution system 422 can send portions of the content item as one or more data packets. The amount of data sent by the content distribution system 422 at any given time can be based, for example, on the size of the buffer allocated by the client computing device 402 or by the amount of data requested by the client computing device 402. As mentioned, the data 408 sent by the content distribution system 422 may include additional information about the content being streamed including, for example, the rate (e.g., bit rate) at which the content was encoded.

Once the data 408 is received, the content player 404 can process (e.g., decode) the data and present the content through the client computing device 402, for example. In various embodiments, the content player 404 can be configured to evaluate the running rate at which the content is being streamed with respect to the source rate at which the content was encoded. In the example of FIG. 4, the client computing device 402 has determined 412 that the content was encoded at 400 kilobits per second and that the content is streaming at a rate of 250 kilobits per second. In this example, since the running, or streaming, rate (e.g., 250 kbps) is less than the source rate at which the content was encoded (e.g., 400 kbps), the content player 404 can take measures to adjust the running rate to be more consistent with the source rate using one or more of the various approaches described above in reference to FIG. 2.

Figure 5:
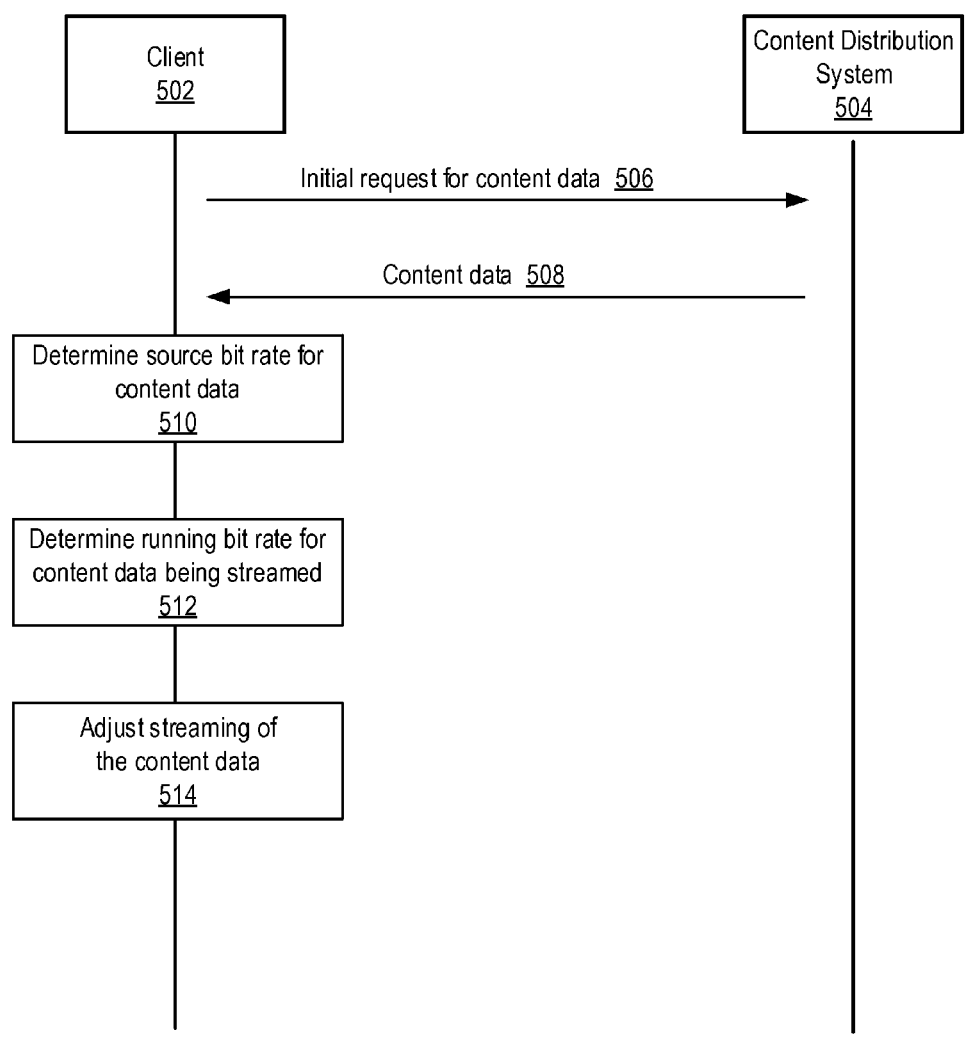
FIG. 5 illustrates an example diagram that depicts the dynamic adjustment of content streaming, according to an embodiment of the present disclosure.

FIG. 5 illustrates an example diagram 500 that depicts the dynamic adjustment of content streaming, according to an embodiment of the present disclosure. It should be appreciated that there can be additional, fewer, or alternative steps performed in similar or alternative orders, or in parallel, within the scope of the various embodiments discussed herein unless otherwise stated.

In the example of FIG. 5, a client computing device 502 is interacting with a content distribution system 504 to stream a content item. To stream the content item, the client computing device 502 can send an initial request 506 for the content item to the content distribution system 504. The content distribution system 504 can send data 508 describing the content item to the client computing device 502. The client computing device 502 can determine 510 the source bit rate for the content data received from the content distribution system 504.

The client computing device 502 can also determine 512 the running bit rate for the content data. The running bit rate represents the number of bits of content that are consumed, or processed, by the client computing device 502 per unit of time (e.g., bits, or kilobits, per second). In various embodiments, the client computing device 502 can adjust 514 the streaming of the content item based at least in part on a comparison of the running bit rate and the source bit rate of the streaming content, as described above in reference to FIG. 2.

Figure 6:
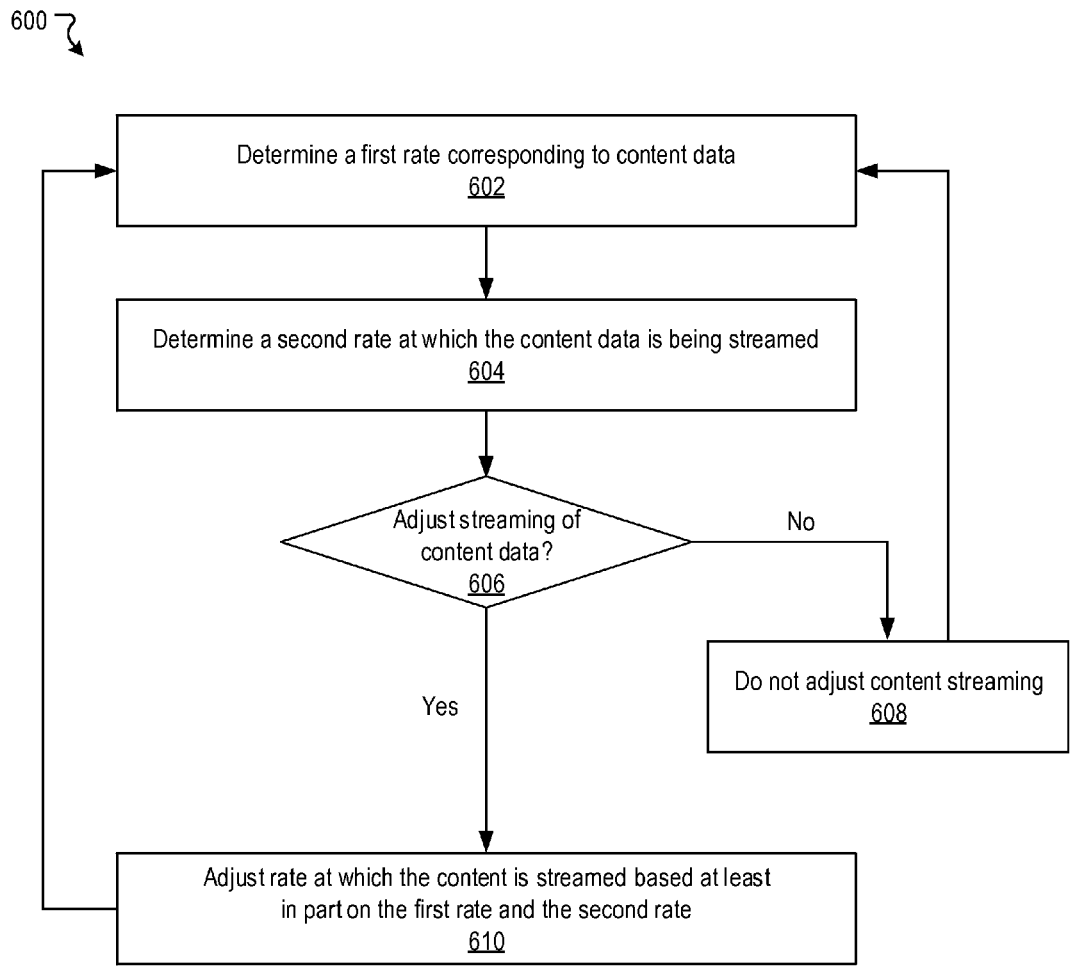
FIG. 6 illustrates an example method that depicts the dynamic adjustment of content streaming, according to an embodiment of the present disclosure.

FIG. 6 illustrates an example method 600 that depicts the dynamic adjustment of content streaming, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can determine a first rate corresponding to content data. The first rate can be determined, for example, by determining the bit rate at which the content data was encoded. At block 604, the method 600 can determine a second rate at which the content data is being streamed. The method 600 can determine whether to adjust 606 streaming of the content data, for example, by comparing the first rate and the second rate, as described above. If the method 600 determines to adjust the streaming of content, at block 610, the method 600 adjusts the streaming of the content data based at least in part on a comparison of the first rate and the second rate. Otherwise, if the method 600 determines that no adjustment of the streaming is needed, then no adjustment 608 is made to the streaming. Other suitable techniques are possible.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
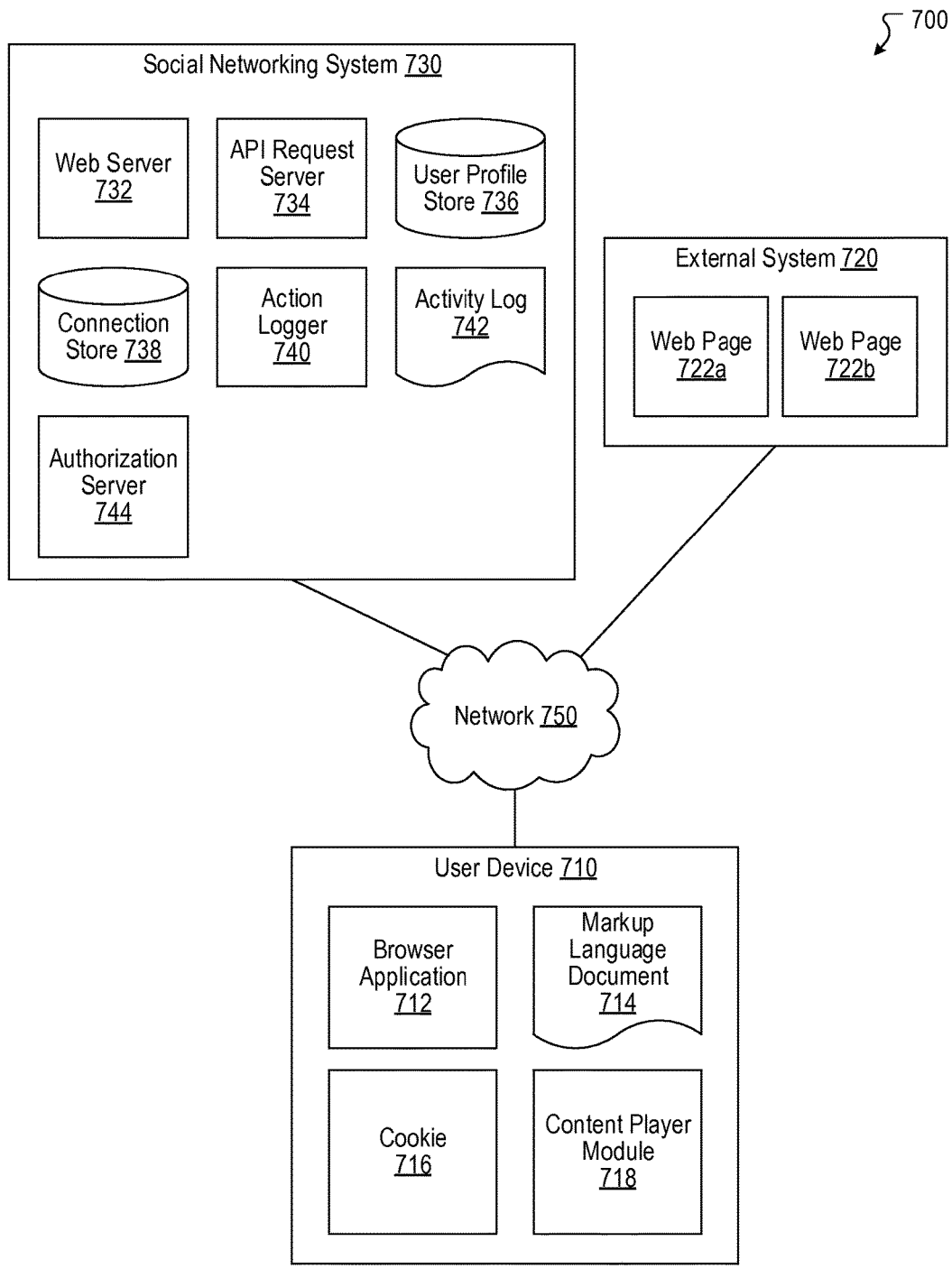
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "oneway." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a content player module 718. The content player module 718 can, for example, be implemented as the content player module 202 of FIG. 2. As discussed previously, it should be appreciated that there can be many variations or other possibilities. Other features of the content player module 718 are discussed herein in connection with the content player module 202.

Hardware Implementation

Figure 8:
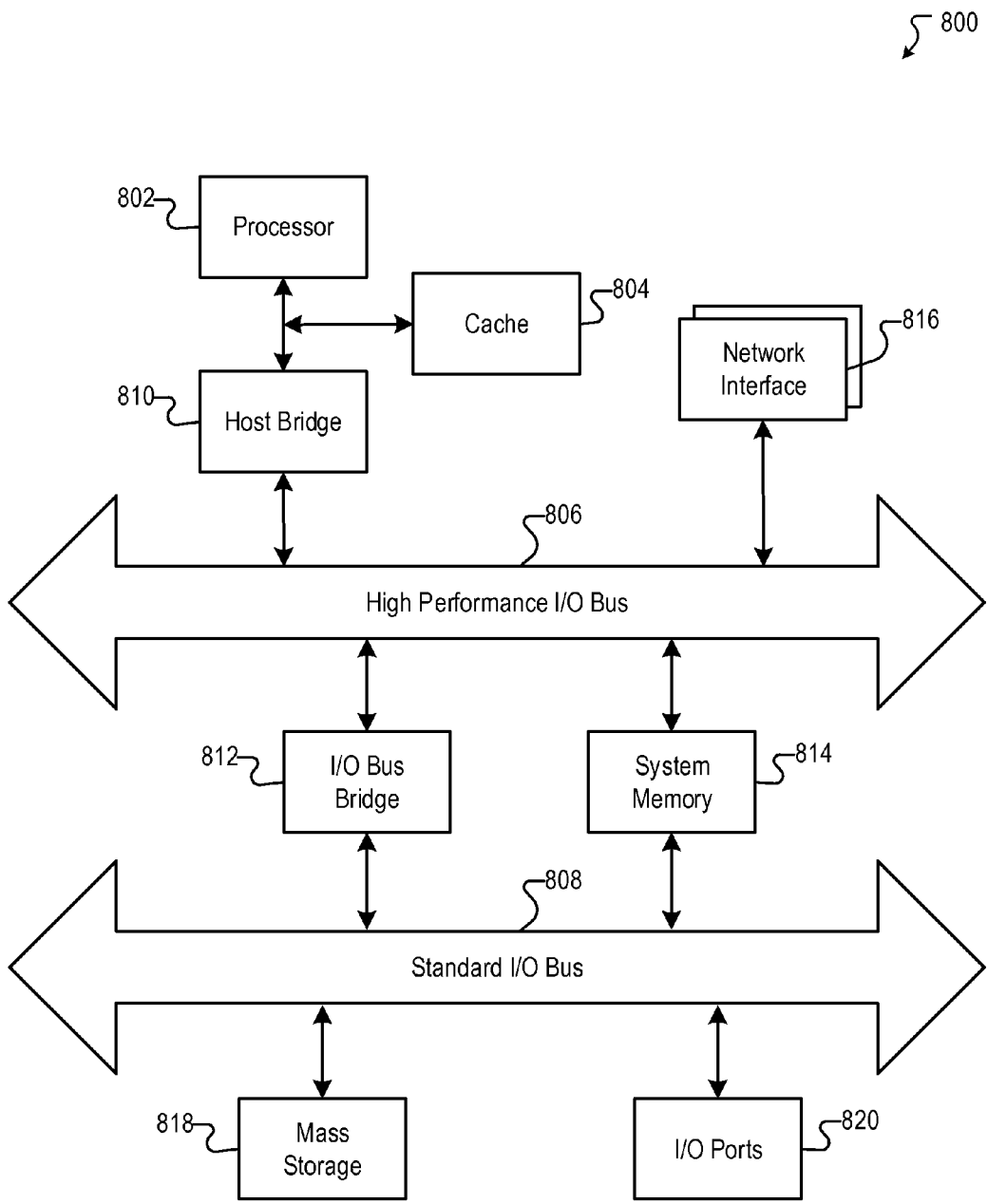
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   sending, by a computing device and to a content system, at least one request for streaming a content item, wherein the request is sent by a content player running on the computing device configured to stream the content item;
   streaming, by the computing device and from the content system, data associated with at least one portion of the content item on the content player;
   receiving, by the computing device, from the content system, an indication of a first rate at which the content item is encoded;
   determining, by the computing device, a second rate at which the content item is being streamed from the content system to the content player running on the computing device by dividing amount of streamed data with a duration of time of streaming the streamed data;
   determining, by the computing device, that an adjustment to the streaming of the content item is needed based at least in part on the first rate and the second rate; and
   adjusting, by the computing device, the streaming of the content item so that the second rate at which the content item is being streamed on the content player matches, within a threshold value, the first rate at which the content item is encoded,
   wherein the first rate and the second rate are bit rates.

2. The computer-implemented method of claim 1, wherein the second rate is greater than the first rate, and wherein adjusting the streaming of the content item further comprises:
   adjusting a size of a buffer for storing data associated with the content item, wherein the adjustment reduces the size of the buffer.

3. The computer-implemented method of claim 1, wherein the second rate is greater than the first rate, and wherein adjusting the streaming of the content item further comprises:
   adjusting an amount of data that is requested in subsequent requests for streaming the content item, wherein the adjustment reduces the amount of data that is requested.

4. The computer-implemented method of claim 1, wherein the second rate is greater than the first rate, and wherein adjusting the streaming of the content item further comprises:
   adjusting a rate at which subsequent requests for streaming the content item are sent by the computing device, wherein the adjustment reduces a number of subsequent requests sent by the computing device or a frequency at which subsequent requests are sent by the computing device.

5. The computer-implemented method of claim 1, wherein the second rate is less than the first rate, and wherein adjusting the streaming of the content item further comprises:
   adjusting a size of a buffer for storing data associated with the content item, wherein the adjustment increases the size of the buffer.

6. The computer-implemented method of claim 1, wherein the second rate is less than the first rate, and wherein adjusting the streaming of the content item further comprises:
   adjusting an amount of data that is requested in subsequent requests for streaming the content item, wherein the adjustment increases the amount of data that is requested.

7. The computer-implemented method of claim 1, wherein the second rate is less than the first rate, and wherein adjusting the streaming of the content item further comprises:
   adjusting a rate at which subsequent requests for streaming the content item are sent by the computing device, wherein the adjustment increases a number of subsequent requests sent by the computing device or a frequency at which subsequent requests are sent by the computing device.

8. The computer-implemented method of claim 1, wherein determining, by the computing device, that the adjustment to the streaming of the content item is needed further comprises:
   determining that the second rate is greater than the first rate; and
   determining that a difference between the second rate and the first rate satisfies a threshold.

9. The computer-implemented method of claim 1, wherein determining, by the computing device, that the adjustment to the streaming of the content item is needed further comprises:

determining that the second rate is less than the first rate; and determining that a difference between the first rate and the second rate satisfies a threshold.

10. The computer-implemented method of claim 1, wherein adjusting the streaming of the content item further comprises:

adjusting a size of a buffer for storing data associated with the content item; and setting a size for a second buffer for storing content data associated with a second content item based at least in part on the adjusted size.

11. A computing device comprising:

at least one processor; and a memory storing instructions that, when executed by the at least one processor, cause the computing device to perform:

sending to a content system at least one request for streaming a content item, wherein the request is sent by a content player running on the computing device configured to stream the content item;

streaming, from the content system, data associated with at least one portion of the content item on the content player;

receiving, from the content system, an indication of a first rate at which the content item is encoded;

determining a second rate at which the content item is being streamed from the content system to the content player running on the computing device by dividing amount of streamed data with a duration of time of streaming the streamed data;

determining that an adjustment to the streaming of the content item is needed based at least in part on the first rate and the second rate; and adjusting the streaming of the content item so that the second rate at which the content item is being streamed on the content player matches, within a threshold value, the first rate at which the content item is encoded, wherein the first rate and the second rate are bit rates.

12. The computing device of claim 11, wherein the second rate is greater than the first rate, and wherein adjusting the streaming of the content item further causes the computing device to further perform:

adjusting a size of a buffer for storing data associated with the content item, wherein the adjustment reduces the size of the buffer.

13. The computing device of claim 11, wherein the second rate is greater than the first rate, and wherein adjusting the streaming of the content item further causes the computing device to further perform:

adjusting an amount of data that is requested in subsequent requests for streaming the content item, wherein the adjustment reduces the amount of data that is requested.

14. The computing device of claim 11, wherein the second rate is greater than the first rate, and wherein adjusting the streaming of the content item further causes the computing device to further perform:

adjusting a rate at which subsequent requests for streaming the content item are sent by the computing device, wherein the adjustment reduces a number of subsequent requests sent by the computing device or a frequency at which subsequent requests are sent by the computing device.

15. The computing device of claim 11, wherein the second rate is less than the first rate, and wherein adjusting the streaming of the content item further causes the computing device to further perform:

adjusting a size of a buffer for storing data associated with the content item, wherein the adjustment increases the size of the buffer.

16. A non-transitory computer-readable storage medium including instructions that, when executed by at least one processor of a computing device, cause the computing device to perform a method comprising:

sending to a content system at least one request for streaming a content item, wherein the request is sent by a content player running on the computing device configured to stream the content item;

streaming, from the content system, data associated with at least one portion of the content item on the content player;

receiving, from the content system, an indication of a first rate at which the content item is encoded;

determining a second rate at which the content item is being streamed from the content system to the content player running on the computing device by dividing amount of streamed data with a duration of time of streaming the streamed data;

determining that an adjustment to the streaming of the content item is needed based at least in part on the first rate and the second rate; and adjusting the streaming of the content item so that the second rate at which the content item is being streamed on the content player matches, within a threshold value, the first rate at which the content item is encoded, wherein the first rate and the second rate are bit rates.

17. The non-transitory computer-readable storage medium of claim 16, wherein the second rate is greater than the first rate, and wherein adjusting the streaming of the content item further causes the computing device to further perform:

adjusting a size of a buffer for storing data associated with the content item, wherein the adjustment reduces the size of the buffer.

18. The non-transitory computer-readable storage medium of claim 16, wherein the second rate is greater than the first rate, and wherein adjusting the streaming of the content item further causes the computing device to further perform:

adjusting an amount of data that is requested in subsequent requests for streaming the content item, wherein the adjustment reduces the amount of data that is requested.

19. The non-transitory computer-readable storage medium of claim 16, wherein the second rate is greater than the first rate, and wherein adjusting the streaming of the content item further causes the computing device to further perform:

adjusting a rate at which subsequent requests for streaming the content item are sent by the computing device, wherein the adjustment reduces a number of subsequent requests sent by the computing device or a frequency at which subsequent requests are sent by the computing device.

20. The non-transitory computer-readable storage medium of claim 16, wherein the second rate is less than the first rate, and wherein adjusting the streaming of the content item further causes the computing device to further perform:

adjusting a size of a buffer for storing data associated with the content item, wherein the adjustment increases the size of the buffer.

* * * * *